United States Patent
Anderson, Jr.

(10) Patent No.: US 8,656,780 B2
(45) Date of Patent: Feb. 25, 2014

(54) METHODS FOR RETROFITTING NATURAL GAS METERS

(75) Inventor: Russell Ellsworth Anderson, Jr., Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 355 days.

(21) Appl. No.: 13/292,365

(22) Filed: Nov. 9, 2011

(65) Prior Publication Data

US 2013/0111969 A1    May 9, 2013

(51) Int. Cl.
*G01D 7/00* (2006.01)
*G01F 25/00* (2006.01)

(52) U.S. Cl.
USPC .............................. 73/587; 73/1.25

(58) Field of Classification Search
USPC .................. 73/1.16, 1.25, 1.26, 587
See application file for complete search history.

(56) References Cited

U.S. PATENT DOCUMENTS

| | | | | |
|---|---|---|---|---|
| 2,140,562 A | * | 12/1938 | Snow | 73/1.16 |
| 2,329,042 A | * | 9/1943 | Fuller | 73/1.16 |
| 3,605,480 A | * | 9/1971 | St. Claire | 73/1.25 |
| 7,073,534 B2 | | 7/2006 | Sawchuk et al. | |
| 7,373,808 B2 | | 5/2008 | Zanker et al. | |
| 8,290,721 B2 | * | 10/2012 | Wehrs et al. | 702/45 |
| 2004/0055816 A1 | * | 3/2004 | Gallagher et al. | 181/256 |
| 2006/0006022 A1 | * | 1/2006 | Gallagher et al. | 181/257 |
| 2006/0096650 A1 | | 5/2006 | Sawchuk et al. | |

OTHER PUBLICATIONS

CPA 50E Flow Conditioner Quick Specifications, Canada Pipeline Accessories, www.flowconditioner.com, Jul. 9, 2010.
Effect of Turbulence on Orifice Meter Performance, Botros, et al., Jornal of offshore Mechanics and Arctic Engineering—ASME, May 1995.
Flow Conditioning for Natural Gas Measurement, Sawchuk, et al., C.G.A. Gas Measurement School, Edmonton, Alberta, Jun. 1998.
Effect of Flow Conditioners and Pulsation on the Performance of 8 inch Multi-path Ultrasonic Meters, Kamik et al., International Pipeline Conference 1998, Jun. 1998.
Flow Conditioning and Effects on Accuracy for Fluid Flow Measurement, Rans, et al., 7th South East Asia Hydrocarbon Flow Measurement Workshop, Mar. 5-7, 2008.

\* cited by examiner

*Primary Examiner* — Hezron E Williams
*Assistant Examiner* — Nathaniel Kolb
(74) *Attorney, Agent, or Firm* — Karen R. DiDomenicis; Stephen Zavell

(57) ABSTRACT

Disclosed are methods for diagnosing poor performance of natural gas meter stations which utilize tube bundle flow conditioners upstream of orifice plates and methods for retrofitting the natural gas meter stations to improve accuracy of orifice measurements. Diagnostic methods include making measurements of decibels of sound upstream and downstream of the orifice plate, detecting intermittent sounds from a check valve downstream of the orifice plate, and visually inspecting the internal surface of the meter tube downstream of the orifice plate. Accuracy of orifice measurements is improved by replacing a tube bundle flow conditioner with a one-piece plate flow conditioner.

12 Claims, 1 Drawing Sheet

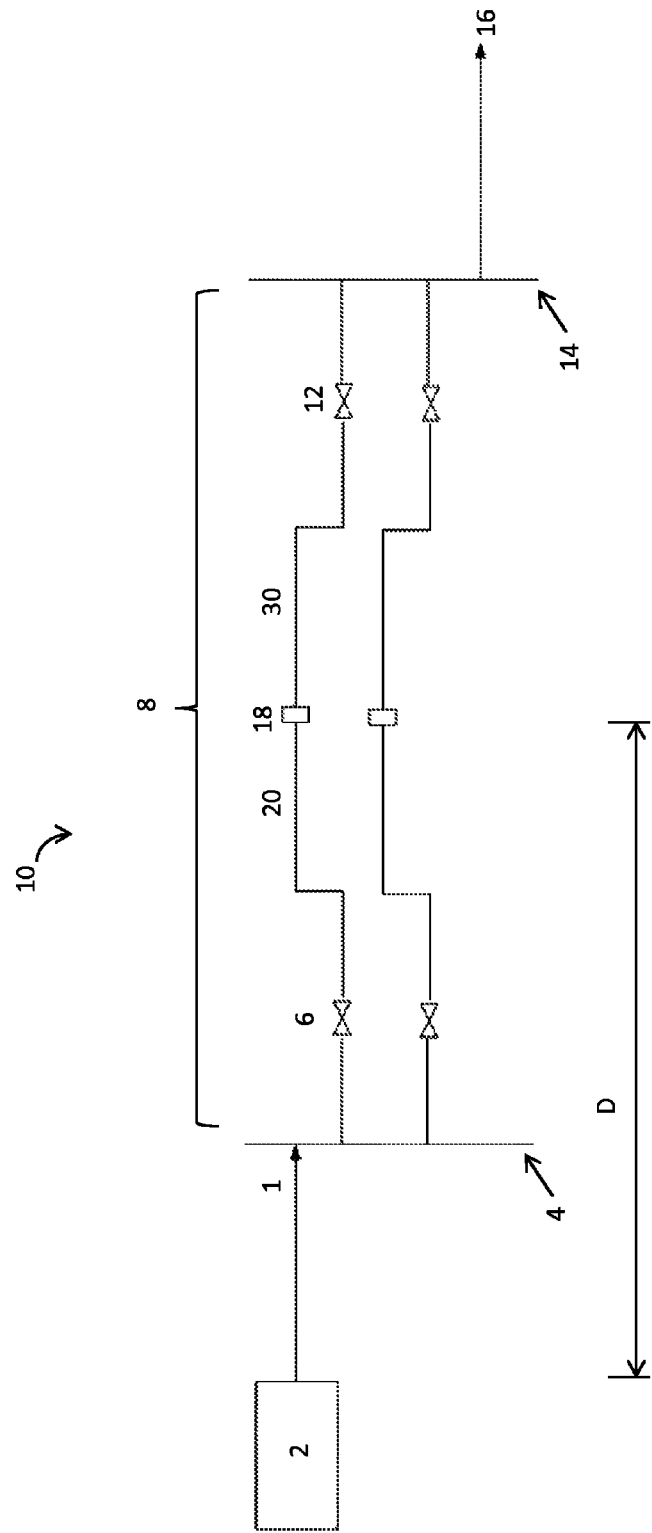

METHODS FOR RETROFITTING NATURAL GAS METERS

FIELD

The present disclosure relates to methods for retrofitting natural gas meters which utilize orifice plates and tube bundle flow conditioners.

BACKGROUND

Natural gas meter stations receive natural gas in large volumes. To measure the volumetric flow rate of the gas, such meter stations frequently utilize orifice plates in a section of pipe referred to as a meter run. The orifice plate is used to measure differential pressure which, along with static pressure, is used to calculate the volumetric flow rate of gas passing through the meter run. The orifice plate measurements assume an ideal turbulent flow gas velocity profile through the meter run and across the orifice plate. In reality, because of particular aspects of the design of natural gas meter stations, this ideal flow profile across the orifice plate may not be the actual flow profile. As a result, orifice plate measurements are therefore frequently inaccurate. For large natural gas meter stations, e.g. those handling between about 10 and 300 million standard cubic feet per day, any inaccuracy of such measurements can have a large financial impact.

Upstream of a natural gas meter station, there may be a reciprocating compressor, resulting in pulsation of natural gas flowing through pipe and header. Ideally, a natural gas meter station would be located a significant distance, e.g. at least a half-mile, from such a compressor to allow time for the gas flow to develop a turbulent flow profile. However, this distance is not always provided because of land-use and other practical constraints. It has been found that the larger the compressor, the greater the effect of pulsation of the gas on the accuracy of the orifice plate measurement.

In addition to the type of compressor, the size of the compressor and the proximity of the compressor to the meter run, meter station design aspects which affect orifice plate measurement accuracy also include the presence of bends, such as 90° bends, and changes of direction, particularly out-of-plane changes of direction, in pipe upstream of the orifice plate. Such bends and changes of direction result in swirling of the gas flowing through the pipe. Swirling of the gas passing through the meter run prevents the gas from assuming the ideal turbulent flow profile, and therefore reduces orifice plate measurement accuracy.

It would be desirable to have a method for retrofitting a natural gas meter to improve the accuracy of orifice measurements across orifice plates in natural gas meters.

SUMMARY

According to one embodiment, a method is provided for retrofitting a natural gas meter utilizing an orifice plate and a tube bundle flow conditioner upstream of the orifice plate. The method includes, with the meter flowing, first measuring decibels of sound at a first location proximate the meter between the tube bundle flow conditioner and the orifice plate upstream of the orifice plate. Also with the meter flowing, decibels of sound are measured at a second location proximate the meter downstream of the orifice plate. The difference in decibels of sound at the first and second locations is then determined. When the difference in decibels of sound is greater than about 3 decibels, the tube bundle flow conditioner is replaced with a one-piece plate flow conditioner. The accuracy of orifice measurement across the orifice plate is thereby improved.

According to another embodiment, a method of retrofitting a natural gas meter utilizing an orifice plate, a header and a tube bundle flow conditioner upstream of the orifice plate includes replacing the tube bundle flow conditioner with a one-piece plate flow conditioner when the header and meter run upstream of the orifice plate includes at least one of 90° bends and out of plane changes of direction.

According to another embodiment, a method of retrofitting a natural gas meter utilizing an orifice plate, a tube bundle flow conditioner upstream of the orifice plate and a check valve downstream of the orifice plate is provided, the method including replacing the tube bundle flow conditioner with a one-piece plate flow conditioner when intermittent sound is detected proximate the check valve with the meter flowing.

DESCRIPTION OF THE DRAWINGS

These and other objects, features and advantages of the present invention will become better understood with regard to the following description, appended claims and accompanying drawings where:

FIG. 1 is a schematic diagram of a natural gas compressor, header and meter run according to one exemplary embodiment.

DETAILED DESCRIPTION

Methods for diagnosing poor accuracy of orifice measurements across an orifice plate in an existing natural gas meter run utilizing a tube bundle flow conditioner upstream of the orifice plate and methods for improving said accuracy will now be described.

As used herein, the terms "natural gas meter," "natural gas meter run," are used interchangeably to refer to an apparatus including an orifice plate for measuring the volumetric flow rate of gas passing there through. The term "meter tube" refers to a section of pipe in a natural gas meter. The term "orifice plate" refers to an apparatus for use in a natural gas meter for measuring the pressure differential across the orifice plate. The term "orifice measurement" refers to the differential pressure measurement across the orifice plate which in turn is used to calculate volumetric flow rate of gas through the meter. The term "natural gas meter station" refers to a facility for receiving and distributing natural gas in which the volumetric flow rate of the natural gas received is measured. The term "tube bundle flow conditioner" refers to an apparatus which includes a bundle of parallel tubes generally designed to fit within a meter tube upstream of an orifice plate, which parallel tubes have sufficient length to impact the gas velocity profile of the gas passing there through, i.e. the distribution of gas velocity across a cross-section of the meter tube. The term "one-piece plate flow conditioner" refers to an apparatus in the form of a plate having a plurality of holes therein designed to fit across a cross-section of the meter tube upstream of an orifice plate which impacts the gas velocity profile of the gas passing there through.

In one embodiment, an existing natural gas meter which includes an orifice plate and a tube bundle flow conditioner upstream of the orifice plate is located downstream of a gas compressor such as a reciprocating type compressor. The compressor imparts pulsation to the gas upstream of the gas meter. It has been found that the pulsating gas results in sound which can be measured and used to diagnose a poorly performing meter station, i.e. one with inaccurate orifice measurements. An audio meter can be used with the meter flowing at a relatively steady flow rate to measure decibels (dB) of sound at a first location proximate the meter between the tube bundle flow conditioner and the orifice plate, and at a second location proximate the meter downstream of the orifice plate. The difference in decibels of sound between the first and second locations is determined, and if the difference is found to be greater than about 3 dB, the tube bundle flow conditioner is replaced with a one-piece plate flow conditioner.

The audio meter can be any suitable means for determining decibels of sound at the first and second locations. For instance, a handheld electronic audio meter can be used. A recording device for recording sound at the first and second locations can also be used, thus enabling further analysis of the sound using software and storage of related data. By "proximate the meter" is meant positioned at a distance of less than about 30 cm from the meter. In one embodiment, an audio meter is positioned a distance of from about 5 to about 8 cm from the meter at the first and second locations. Multiple measurements may be made using the audio meter and averaged for each of the first and second locations.

Referring to FIG. 1, a natural gas meter station 10 is illustrated. A compressor 2 compresses natural gas and sends natural gas 1 to an inlet header 4 which distributes gas to individual meter runs. The meter station can include one or more meter runs 8. FIG. 1 illustrates a meter station 10 having two meter runs 8. Each meter run 8 includes a valve 6 which can be used to discontinue gas flow upstream of an orifice fitting 18. The orifice fitting 18 has an orifice plate (not shown) therein. A check valve 12 downstream of the orifice fitting 18 prevents backflow of gas to the orifice plate. The gas from the meter runs collects in the outlet header 14, and gas stream 16 then exits from the outlet header for further processing and distribution. Reference numeral 20 indicates the general location of the first location at which sound is measured, and reference numeral 30 indicates the general location of the second location at which sound is measured. When the difference in decibels between the sound measurements at the first and second locations is greater than about 3 dB, the meter station is retrofitted by replacing a tube bundle flow conditioner, located in the meter run upstream of the orifice fitting 18, with a one-piece plate flow conditioner.

Pulsating gas in the meter can furthermore result in intermittent opening and closing of the check valve 12. As a result of the intermittent opening and closing of the check valve 12, intermittent sound may be detected proximate the check valve. In one embodiment, the natural gas meter can be retrofitted to improve accuracy of the orifice measurement by replacing the tube bundle flow conditioner with a one-piece plate flow conditioner when intermittent sound is detected proximate the check valve with the meter flowing. Such sound can be detected by any convenient means, including using an audio meter, a recording device or human hearing.

After a period of operation of a natural gas meter station over time, for instance, over a period of years, a section of a meter tube can be removed from a meter run and an internal portion of the meter tube downstream of the orifice plate visually inspected. Evidence of gas pulsation may be found within the meter tube. Such evidence can include a repeating pattern of deposits such as stripes on the internal walls of the meter tube. The deposits may be referred to as "pipeline rouge" and may consist of oil from the compressor, iron filings and/or other contamination. In one embodiment, if such evidence is found, the meter is retrofitted by replacing the tube bundle flow conditioner with a one-piece plate flow conditioner.

In one embodiment, it has been found that the accuracy of orifice measurement in a natural gas meter which utilizes a tube bundle flow conditioner upstream the orifice plate can be improved by replacing the tube bundle flow conditioner with a one-piece plate flow conditioner when the distance D between the orifice fitting 18 and a compressor 2 upstream of the orifice fitting is determined to be less than 500 m.

Some natural gas meter stations include 90° bends and/or out-of-plane changes of direction within the header 4 and the portion of the meter run 8 upstream of the orifice fitting 18. It has been found that such bends and turns in the pipe create swirl in the gas which negatively impacts the accuracy of the orifice measurement. In one embodiment, it has been found that the accuracy of orifice measurement can be improved by replacing the tube bundle flow conditioner with a one-piece plate flow conditioner when the header and meter run upstream of the orifice fitting includes 90° bends and/or out-of-plane changes of direction.

EXAMPLE

A natural gas meter station similar to that illustrated in FIG. 1 with a history of consistently over-measuring the volumetric flow rate of gas received was investigated. The line segment, i.e., the group of metering stations, involved had a daily volume of approximately 280,000 MCFD (thousand cubic feet per day) and a daily loss of 1800 to 2400 MCFD. The natural gas meter station had a daily volume of approximately 178,000 MCFD; therefore the station handled about 63% of the segment volume. The distance D between a reciprocating compressor 2 and the orifice fitting 18 was approximately 200 yards (180 m). The compressor was a 10,000 hp Cooper Besmer engine operating at 280-300 RPM with 16 20-inch cylinders. Inlet header 4 had a diameter of approximately 30 inches (76 cm), and the meter tube in meter run 8 had a diameter of approximately 10 inches (25 cm). In the meter run 8 approximately 10 pipe diameters of length upstream from the orifice fitting 18 was a tube bundle flow conditioner which had been in place for a period of operation of at least about 15 years.

With the meter flowing, intermittent sound was detected in the vicinity of check valve 12 which was located approximately 5 pipe diameters of length downstream of the orifice fitting 18.

A handheld electronic audio meter (RadioShack Digital Sound Level Meter Model 33-2055, available from RadioShack Corporation) was used to measure decibels of sound at locations 20 and 30. To measure the sound at the upstream location 20, the meter was held about 3 inches (7.6 cm) from the meter tube between the tube bundle and the orifice fitting 18. Measure the sound that the downstream location 30, the meter was held about 3 inches (7.6 cm) from the meter tube a similar distance from the orifice plate downstream of the orifice plate. Several readings were taken and averaged at each location. The sound at the first location 20 was measured to be approximately 75 dB, and the sound at the second location 30 was measured to be approximately 84 dB. The difference in decibels between the first and second locations was determined to be 9 dB, greater than 3 dB.

With no gas flowing in the meter station, meter run 8 was removed and the internal surface of the meter tube downstream of the orifice plate was visually inspected, and a pattern of deposits in the form of generally parallel stripes was observed.

The tube bundle flow conditioner was replaced with a one-piece plate flow conditioner obtained from Canada Pipeline Accessories, Calgary, Alberta. As a result, over measurement of incoming gas to the line segment including this metering station was reduced by about 1,000 MCFD. This decrease of over measurement an indicates improvement of accuracy of orifice measurement across the orifice plate.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method of retrofitting a natural gas meter utilizing an orifice plate and a tube bundle flow conditioner upstream of the orifice plate, the method comprising:
   a. with the meter flowing, measuring decibels of sound at a first location proximate the meter between the tube bundle flow conditioner and the orifice plate upstream of the orifice plate;
   b. with the meter flowing, measuring decibels of sound at a second location proximate the meter downstream of the orifice plate;
   c. determining the difference in decibels of sound at the first and second locations; and
   d. replacing the tube bundle flow conditioner with a one-piece plate flow conditioner when the difference in decibels of sound is greater than about 3 decibels.

2. The method of claim 1, wherein the difference in decibels of sound is thereby reduced.

3. The method of claim 1, wherein the accuracy of orifice measurement across the orifice plate is thereby improved.

4. The method of claim 1, wherein the decibels of sound are measured using an electronic audio meter.

5. The method of claim 1, wherein the decibels of sound are measured using an audio meter positioned a distance of less than about 30 cm from the meter at the first and second locations.

6. The method of claim 1, wherein the decibels of sound are measured using an audio meter positioned a distance of between about 5 and about 8 cm from the meter at the first and second locations.

7. The method of claim 1, wherein multiple measurements of the decibels of sound at each of the first and second locations are made and averaged for each of the first and second locations.

8. The method of claim 1, further comprising:
   a. removing a section of the meter tube from the meter run in a natural gas meter station after a period of operation;
   b. visually inspecting an internal portion of the meter tube downstream of an orifice plate within the meter tube to identify evidence of gas pulsation; and
   c. replacing the tube bundle flow conditioner with a one-piece plate flow conditioner when evidence of gas pulsation is found.

9. The method of claim 1, wherein the distance between the orifice plate and a compressor upstream of the orifice plate is less than 500 m.

10. A method of retrofitting a natural gas meter utilizing an orifice plate, a tube bundle flow conditioner upstream of the orifice plate and a check valve downstream of the orifice plate, the method comprising:
    replacing the tube bundle flow conditioner with a one-piece plate flow conditioner when intermittent sound is detected proximate the check valve with the meter flowing.

11. The method of claim 10, wherein the accuracy of orifice measurement across the orifice plate is thereby improved.

12. The method of claim 10, wherein the distance between the orifice plate and a compressor upstream of the orifice plate is less than 500 m.

* * * * *